(12) United States Patent
Spencer

(10) Patent No.: US 7,828,361 B1
(45) Date of Patent: Nov. 9, 2010

(54) TONNEAU COVER

(75) Inventor: Michael Spencer, Hubbard, NE (US)

(73) Assignee: Truxedo, Inc., Yankton, SD (US)

( * ) Notice: Subject to any disclaimer, the term of this patent is extended or adjusted under 35 U.S.C. 154(b) by 491 days.

(21) Appl. No.: 11/852,423

(22) Filed: Sep. 10, 2007

Related U.S. Application Data

(60) Provisional application No. 60/844,306, filed on Sep. 13, 2006.

(51) Int. Cl.
*B60J 11/00* (2006.01)

(52) U.S. Cl. ............... 296/98; 296/100.18; 296/100.16

(58) Field of Classification Search ............ 296/98, 296/100.16, 100.18
See application file for complete search history.

(56) References Cited

U.S. PATENT DOCUMENTS 6,719,353 B1 * 4/2004 Isler et al. ............... 296/98

* cited by examiner

*Primary Examiner*—Joseph D Pape

(57) ABSTRACT

A tonneau cover and a method of operating a tonneau cover that covers a cargo box on a pickup. The tonneau cover is positionable in a closed configuration, a rolled-up configuration and a front access configuration. The method includes rolling up the tonneau cover to uncover a first part of the cargo box. The method also includes pivoting a portion of the tonneau cover to uncover a second part of the cargo box.

33 Claims, 16 Drawing Sheets

TONNEAU COVER

REFERENCE TO RELATED APPLICATION

This application claims priority to U.S. Applic. No. 60/844,306, filed Sep. 13, 2006, the disclosure of which is incorporated herein by reference.

FIELD OF THE INVENTION

The invention relates generally to covers for vehicles. More particularly, the invention relates to tonneau covers for cargo boxes on a pickup.

BACKGROUND OF THE INVENTION

Tonneau covers are used in conjunction with the cargo box of pickups to protect items placed in the cargo box from exposure to dirt, debris, and other environmental contaminants. Tonneau covers are also used to enhance the aesthetic appearance of the pickup.

There are two main types of tonneau covers—hard and soft. Hard tonneau covers include one or more pieces that when placed in a closed position form a generally rigid cover over the cargo box. In contrast, the soft tonneau covers are fabricated from a soft material that is maintained in a desired position with a frame. When the soft tonneau covers are not being used, they may be rolled up to expose the interior of the cargo box.

SUMMARY OF THE INVENTION

An embodiment of the invention is directed to a tonneau cover including a cover portion and a frame portion. The cover portion has a relatively flexible configuration. The frame portion includes a first side rail and a second side rail. The first side rail has a first rail section, a second rail section and a first hinge mechanism. The second side rail has a third rail section, a fourth rail section and a second hinge mechanism. The tonneau cover is configurable in a closed configuration, a rolled-up configuration and a front open configuration where the first rail section is oriented at an acute angle with respect to the second rail section.

An embodiment of the invention is directed to a method of operating a tonneau cover that covers a cargo box on a pickup. The cargo box has a front end and a back end. The method includes positioning the tonneau cover in a closed configuration where the tonneau cover substantially covers the cargo box. The tonneau cover can be rolled-up to a rolled-up configuration where substantially all of the cargo box is not covered by the tonneau cover. A portion of the tonneau cover can be pivoted to a partial open configuration.

DETAILED DESCRIPTION OF THE PREFERRED EMBODIMENTS

An embodiment of the invention is directed to a tonneau cover 10 for a cargo box 12 of a pickup, as illustrated in the figures. The tonneau cover 10 thereby protects objects that are placed in the pickup cargo box 12.

Figure 1:
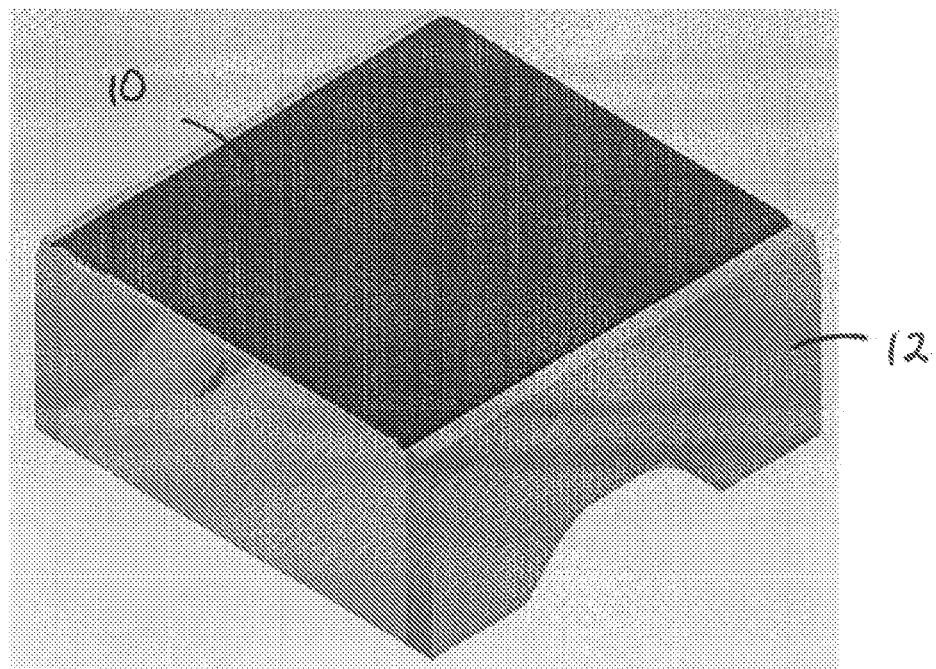
FIG. 1 is a perspective view of a tonneau cover in a closed configuration according to an embodiment of the invention.
Figure 2:
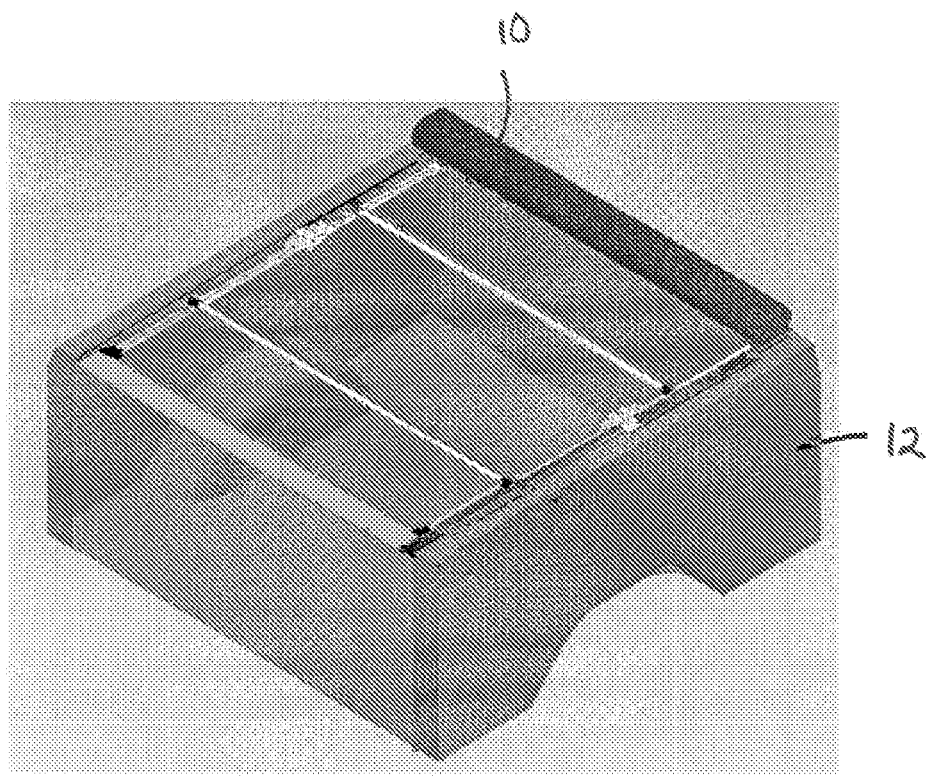
FIG. 2 is a perspective view of the tonneau cover in a rolled-up configuration.
Figure 3:
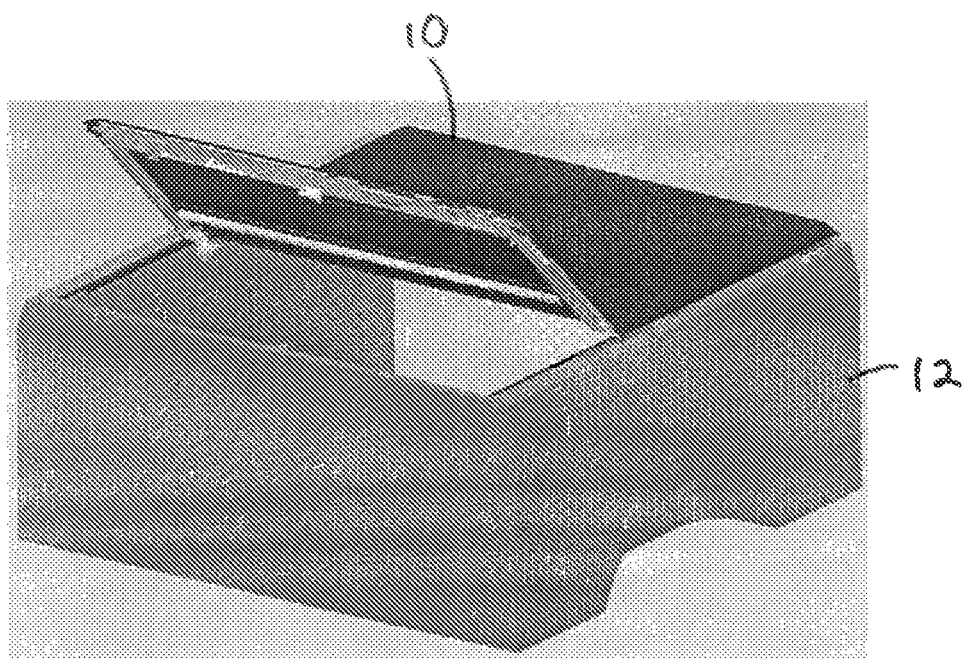
FIG. 3 is a perspective view of the tonneau cover in a partial front open configuration.
Figure 4:
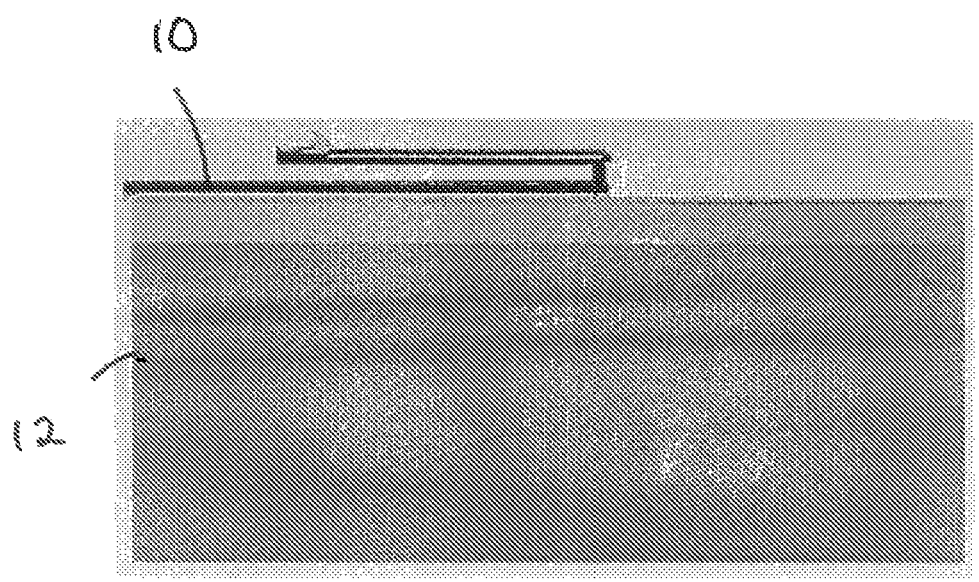
FIG. 4 is a side view of the tonneau cover in a full front open configuration.

The tonneau cover 10 is positionable in a closed configuration (FIG. 1), a rolled up configuration (FIG. 2), and a front access configuration (FIGS. 3-4). When the tonneau cover 10 is in the closed configuration, the pickup cargo box 12 is substantially covered. When the tonneau cover 10 is in the rolled up configuration, the pickup cargo box 12 is substantially open. When the tonneau cover 10 is in the front access configuration, items placed in a front portion of the pickup cargo box can be accessed.

Figure 5:
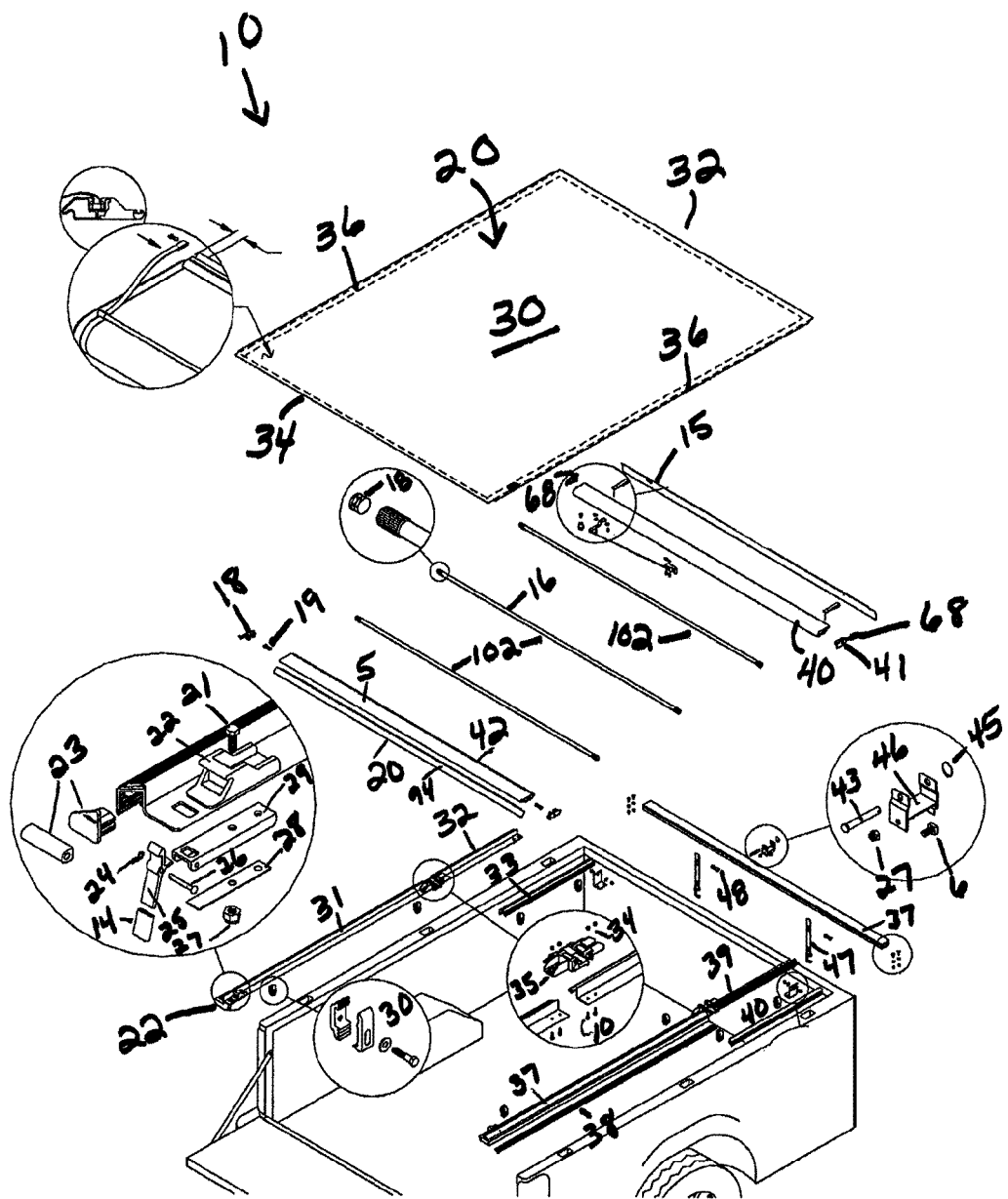
FIG. 5 is an exploded perspective view of the tonneau cover.
Figure 6:
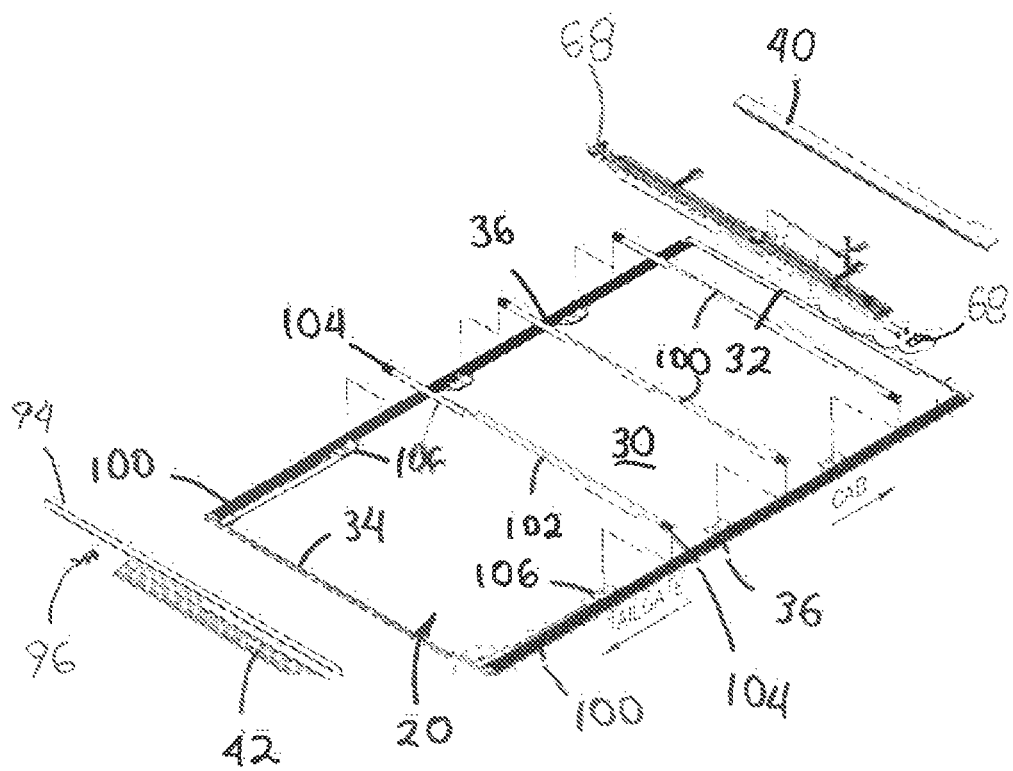
FIG. 6 is a perspective view of a lower side of a cover portion of the tonneau cover.

The tonneau cover 10 generally includes a cover portion 20 that is attachable to a frame portion 22. As illustrated in FIGS. 5-6, the cover portion 20 may include an elongated main section 30 that is defined by a front edge 32, a back edge 34 and a two side edges 36 that each extend between the front edge 32 and the back edge 34. The elongated main section 30 may be fabricated from a variety of materials such as vinyl or leather.

The cover portion 20 may have a front header 40 and a back header 42 that are operably attached proximate the front cover edge 32 and the back cover edge 34, respectively, as illustrated in FIG. 6. While the front header 40 and the back header 42 are illustrated as being an extrusion with substantially consistent profile across a length thereof, it is possible to form the front header 40 and the back header 42 with different configurations using different techniques.

Figure 7:
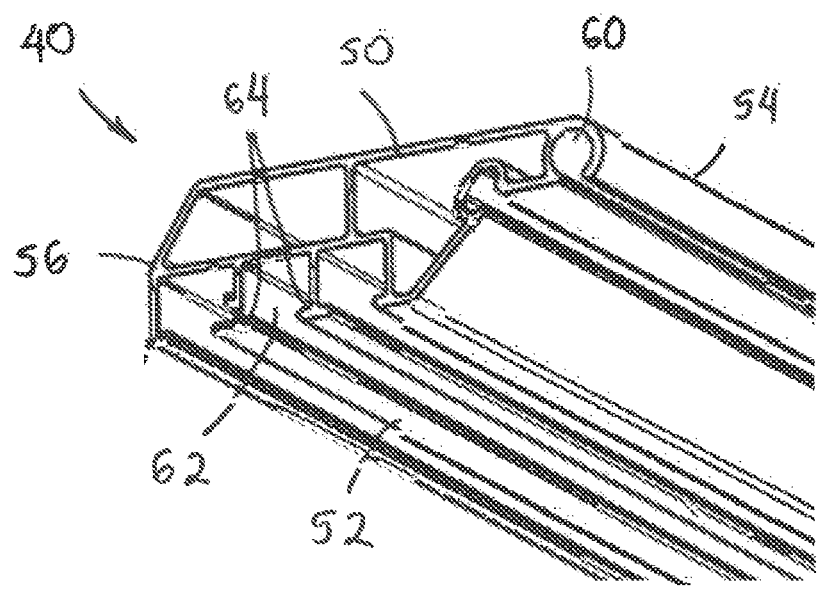
FIG. 7 is a perspective view of a front header for use with the cover portion.

The front header 40 is generally defined by an upper header surface 50, a lower header surface 52, a front header edge 54 and a back header edge 56, as illustrated in FIG. 7. The upper header surface 50 may be substantially flat and curve downwards proximate the front header edge 54.

The front header 40 may include a cover channel 60 formed in the header lower surface 52 proximate the front header edge 54. The cover channel 60 is adapted to receive the front cover edge 32 to thereby attach the cover portion 20 to the front header 40. The cover channel 60 may at least partially be covered. Such a configuration would enable a cover end piece that generally conforms to a surface of the cover channel 60 to resist being pulled out of the cover channel 60 when pulled away from the front header 40.

The front header 40 may include a lock channel 62 formed in the header lower surface 52. A lip 64 may extend at least partially over the lock channel 62. The lock channel 62 is adapted to receive a front lock mechanism 66, which is described in more detail herein.

Figure 8:
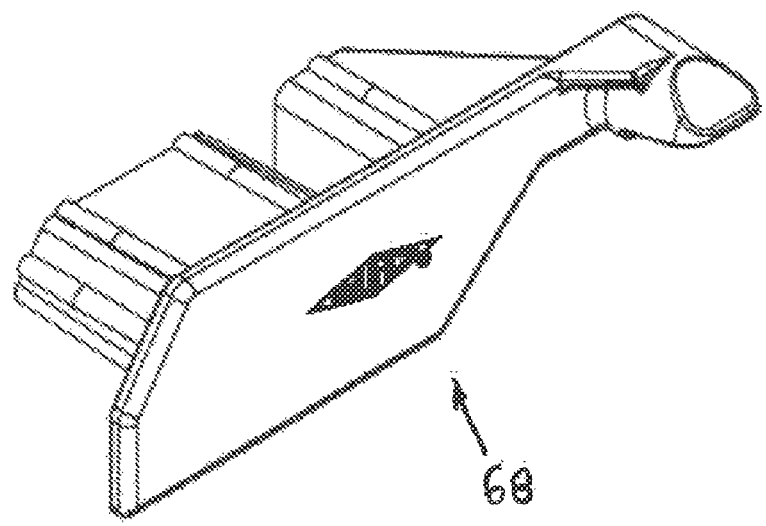
FIG. 8 is a front perspective view of a front header end cap for the front header.
Figure 9:
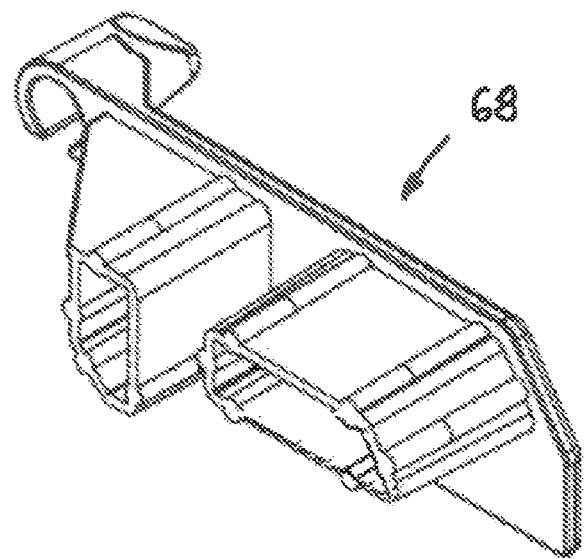
FIG. 9 is a back perspective view of the front header end cap.

Front header end caps 68 may be provided at each end of the front header 40, as illustrated in FIGS. 8-9. The front header end caps 68 substantially conform to the shape of the front header 40 and thereby substantially seal the ends of the front header 40.

Figure 10:
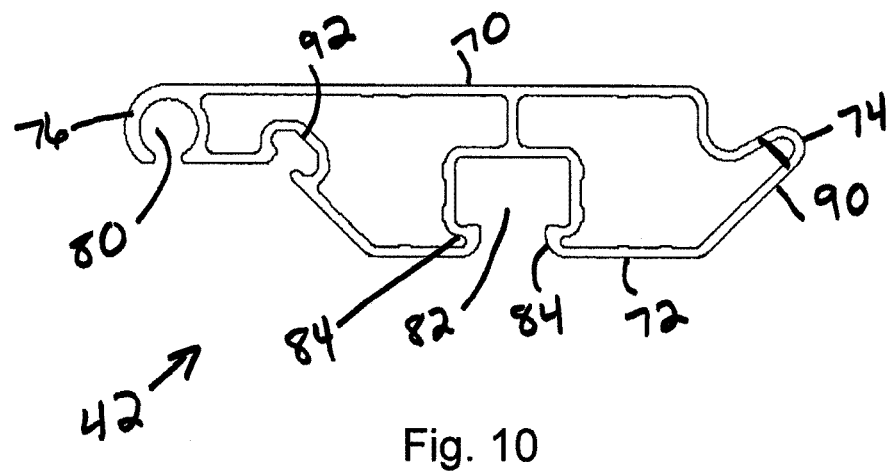
FIG. 10 is a side view of a back header for use with the cover portion.

The back header 42 is generally defined by an upper header surface 70, a lower header surface 72, a front header edge 74 and a back header edge 76, as illustrated in FIG. 10. The upper header surface 70 may be substantially flat and curve downwards proximate the back header edge 76.

The back header 42 may include a cover channel 80 formed in the header lower surface 72 proximate the back header edge 76. The cover channel 80 is adapted to receive the back cover edge 34 to thereby attach the cover portion 20 to the back header 42. The cover channel 80 may at least partially be covered. Such a configuration would enable a cover end piece that generally conforms to a surface of the cover channel 80 to resist being pulled out of the cover channel 80 when pulled away from the back header 42.

The back header 42 may include a lock channel 82 formed in the header lower surface 72. A lip 84 may extend at least partially over the lock channel 82. The lock channel 82 is adapted to receive a back lock mechanism 86, which is described in more detail herein.

The back header 42 may also include an extension 90 extending from the front header edge 74. The extension 90 could assist in attaching the front cover edge 32 to the frame portion 22, as is described in more detail herein.

The back header 42 may also include a seal channel 92 formed in the lower header surface 72 thereof. The seal channel 92 may at least partially be covered. Such a configuration would enable an object with a surface that generally conforms to a surface of the seal channel 92 to resist being pulled out of the seal channel 92 when pulled away from the back header 42.

The seal channel 92 could receive a header seal 94 that substantially extends across the back header 42. The header seal 94 may be fabricated from a resilient material. The header seal 94 thereby enhances the ability to protect items placed in the pickup cargo box 12.

Back header end caps 96 may be attached to the ends of the back header 42. Similar to the front header end caps 68 discussed above, the back header end caps would substantially conform to the shape of the back header 42 and thereby substantially seal the ends of the back header 42.

A releasable fastener 100 is provided along the side edges 36, as illustrated in FIG. 6. The releasable fastener 100 may extend substantially along each of the side edges 36 from the front edge 32 to the back edge 34. The releasable fastener 100 may be a hook and loop fastener such as is available under the designation VELCRO. It is also possible to use alternate releasable fasteners 100 such as snaps.

The cover portion 20 may include at least one support 102 attached thereto at an intermediate location thereof. The at least one support 102 extends between the side edges 36. The at least one support 102 thereby supports a central area of the cover portion 20 in the closed configuration and prevents the cover portion 20 from sagging either on its own weight or from another weight placed on the cover portion 20. It is possible for the at least one support 102 to be formed sufficiently strong to support relatively large weights placed on the cover portion 20.

The at least one support 102 may have a generally cylindrical shape and may be fabricated from a variety of materials such as plastic or metal. To assist in maintaining the at least one support 102 in a desired position with respect to the cover portion 20, a releasable fastener 104 may be provided proximate ends of the at least one support 102. The releasable fastener 104 may be a hook and loop fastener such as is available under the designation VELCRO. It is also possible to use alternate releasable fasteners 104 such as snaps.

The cover portion 20 may include attachment regions 106 mounted thereto along the side edges 36. The attachment regions 106 would be positioned to correspond to the location of the at least one support 102. The attachment regions 106 could include a convex surface to enhance the ability to position the at least one support 102 in a desired location.

To further enhance the ability to maintain the at least one support 102 in the desired location on the cover portion 20, the attachment regions 106 may each include a releasable fastener that is capable of engaging the releasable fastener 104 on the at least one support 102. The releasable fastener may be a hook and loop fastener such as is available under the designation VELCRO. It is also possible to use alternate releasable fasteners such as snaps.

Figure 11:
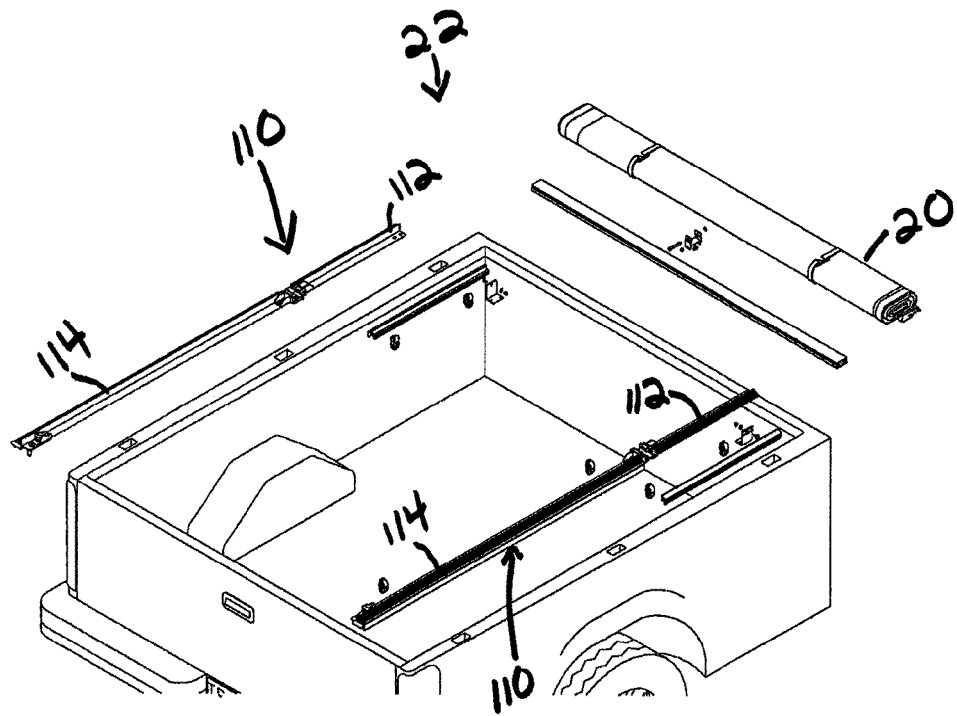
FIG. 11 is a partially exploded perspective view showing the cover portion separate from a frame portion of the tonneau cover.

The frame portion 22 may include two side rails 110 that each have a front rail section 112, a back rail section 114, and a hinge mechanism 116 that operably connects the front rail section 112 and the back rail section 114, as illustrated in FIG. 11.

Figure 12:
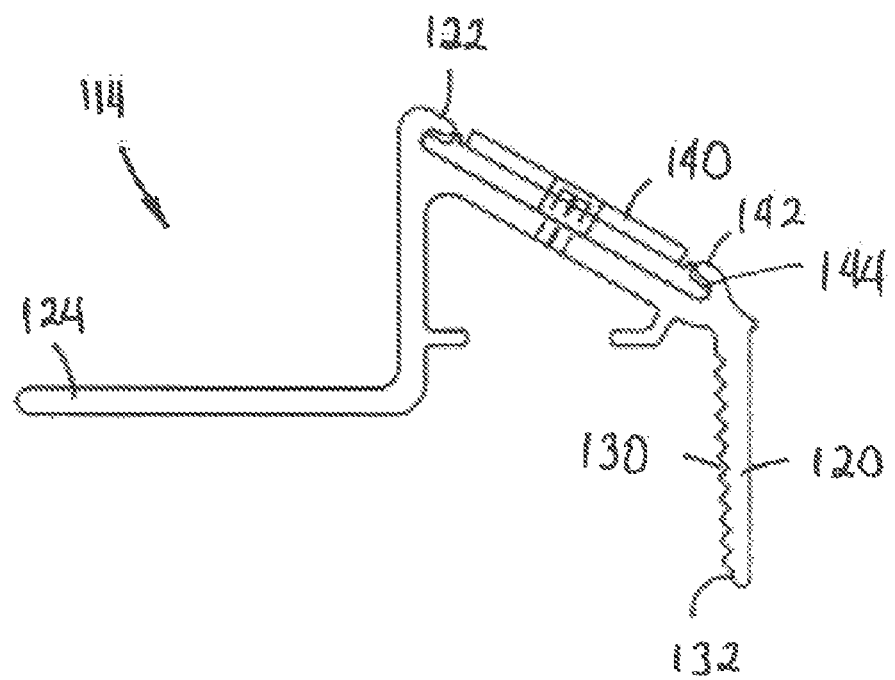
FIG. 12 is a side view of a back rail section of the frame portion.

The back rail section 114 may include a bed attachment region 120, a cover attachment region 122, and a cover support region 124, as illustrated in FIG. 12. The cover attachment region 122 may have a plurality of ridges 130 on an inner surface 132 thereof. The ridges 130 enhance the ability to maintain a clamp 134, which is described in more detail herein, in a stationary position with respect to the back rail section 114 and the pickup cargo box 12.

The cover attachment region 122 may be oriented at an angle 136 of between 0° and 90°. The angle 136 may be between about 15° and 45° and preferably is about 29°. Orienting the cover attachment region 122 at an angle enhances the ability to maintain the cover portion 20 in a fixed position with respect to the frame portion. However, increasing the angle also increases the height of the tonneau cover 10 above the pickup cargo box 12.

A releasable fastener 140 may be provided on the cover attachment region 122 to facilitate attaching the cover portion 20 to the frame portion 22. While it is possible for the releasable fastener 140 to be fixedly attached to the cover attachment region 122, the releasable fastener is preferably mounted to permit sliding movement of the releasable fastener 140 with respect to the cover attachment region 122.

Attaching the releasable fastener 140 in this manner enables the releasable fastener 140 to slide with respect to the cover attachment region 122 such as when the cover portion 20 is being moved between the rolled-up, closed and front open configurations. This attachment mechanism also enables the releasable fastener 140 to move in response to expansion or shrinkage of the main section 30.

The cover attachment region 122 may include arms 142 that partially extend towards each other and thereby define a channel 144 therebetween. The channel 144 thereby retains the releasable fastener 140 therein.

The releasable fastener 140 may be a hook and loop fastener such as is available under the designation VELCRO. It is also possible to use alternate releasable fasteners 140 such as snaps. The releasable fastener 140 is adapted to engage the releasable fastener 100 on the cover portion 20. A backing material may be provided behind the hook and loop fastener to enhance the rigidity of the hook and loop fastener and thereby enhance the ability to retain the releasable fastener 140 in the channel 144.

The cover support region 124 may be recessed with respect to the cover attachment region 122 and may include a generally flat upper surface that supports ends of the at least one support 102. Recessing the cover support region 124 restricts the at least one support 102 from sliding laterally when the cover portion 20 is in the closed configuration.

Figure 13:
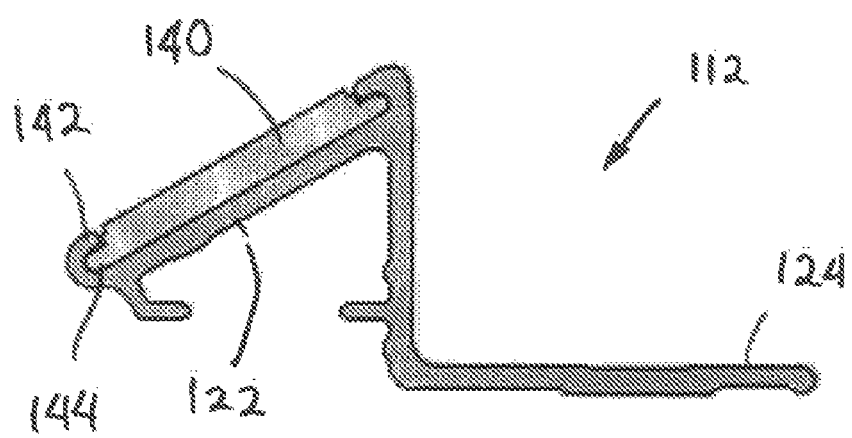
FIG. 13 is a side view of a front rail section of the frame portion.

The front rail section 112 may be shaped substantially similar to the back rail section 114 except that the front rail section 112 does not include the bed attachment region 120, as illustrated in FIG. 13.

The front rail section 112 and the back rail section 114 may be fabricated from a variety of materials. One such suitable material for use in fabricating the front rail section 112 and the back rail section 114 is extruded aluminum because extruded aluminum is strong, relatively lightweight and resists corrosion.

Figure 14:
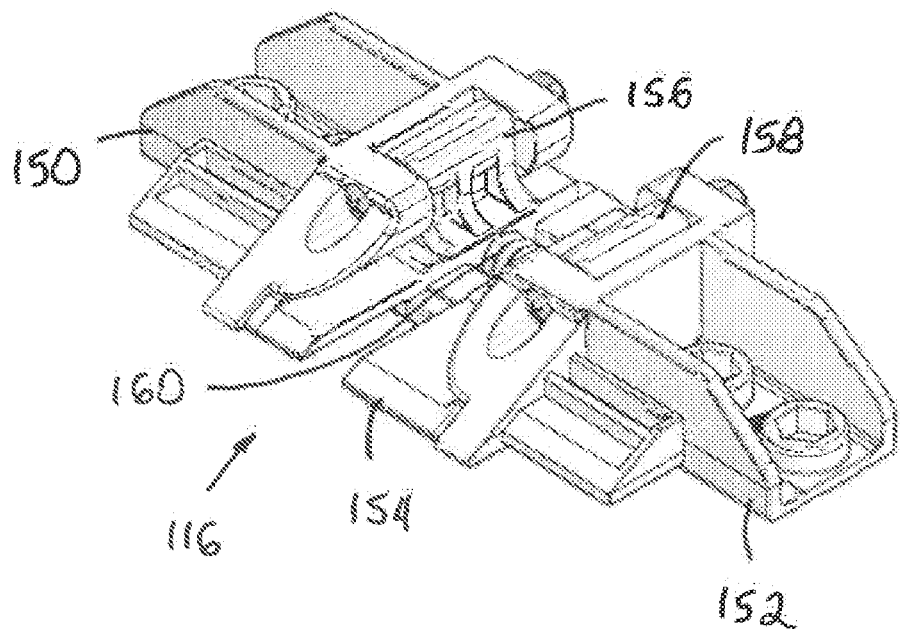
FIG. 14 is a perspective view of a hinge mechanism for use in the frame portion.
Figure 15:
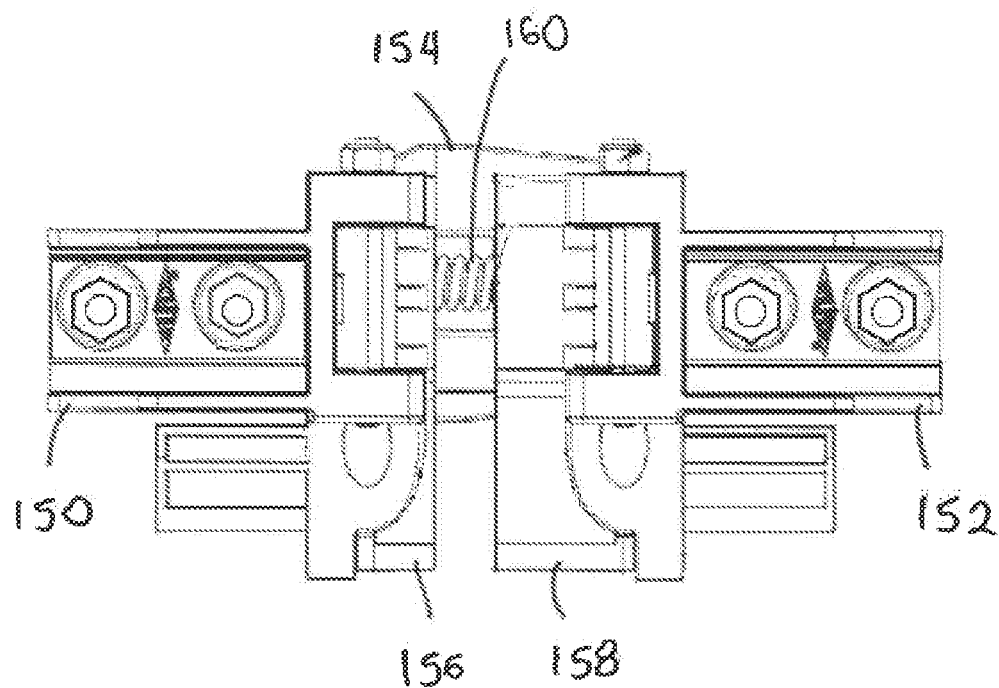
FIG. 15 is a top view of the hinge mechanism.
Figure 16:
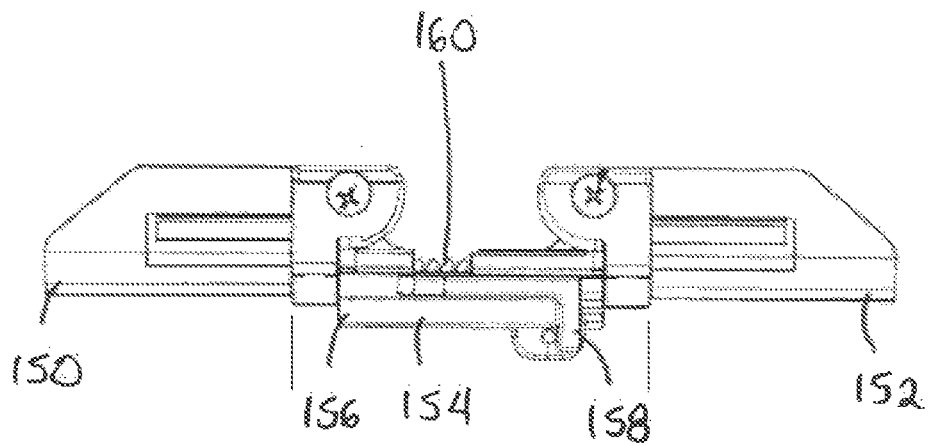
FIG. 16 is a side view of the hinge mechanism.

The hinge mechanism 116 may include a first hinge section 150 and a second hinge section 152 that are operably connected with a central hinge section 154, as illustrated in FIGS. 14-16. The first hinge section 150 is adapted to engage the front rail section 112 such as with a screw. The second hinge section 152 is adapted to engage the back rail section 114 such as with a screw.

The central section 154 may include a first part 156 and a second part 158 that are movable with respect to each other. The first part 156 may be pivotally attached to the first hinge section 150. The second part 158 may be pivotally attached to the second hinge section 152.

In one configuration, the first part 156 and the second part 158 are slidably mounted with respect to each other. The first part 156 and the second part 158 may be biased apart from each other using a bias mechanism 160. This configuration enables the first hinge section 150 to be urged towards the second hinge section 152.

Figure 17:
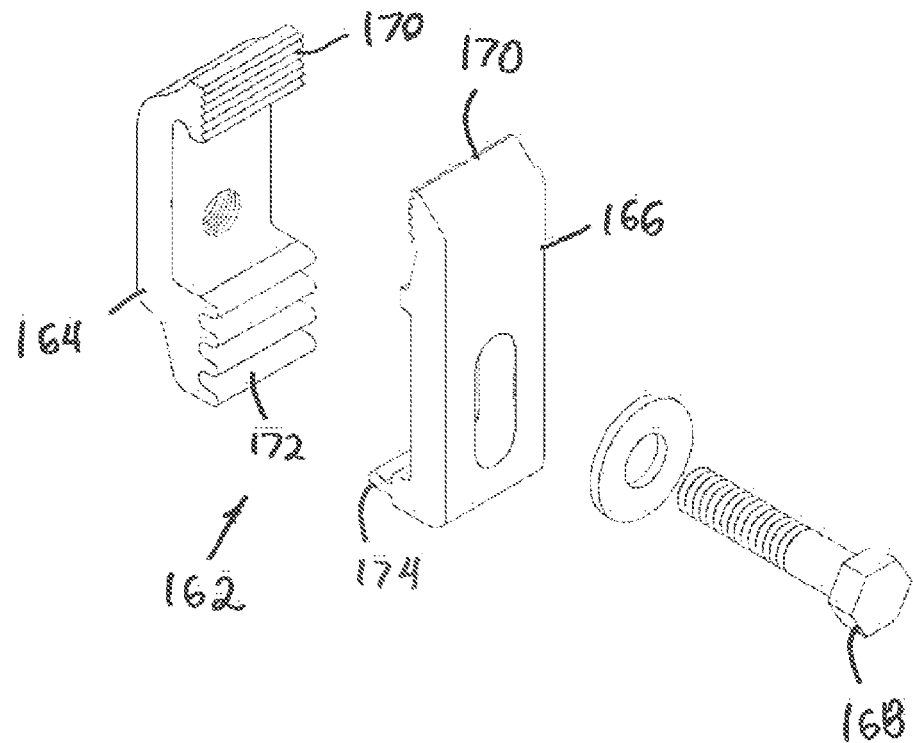
FIG. 17 is a perspective view of a clamp mechanism for attaching the frame portion of a cargo box of a pickup.
Figure 18:
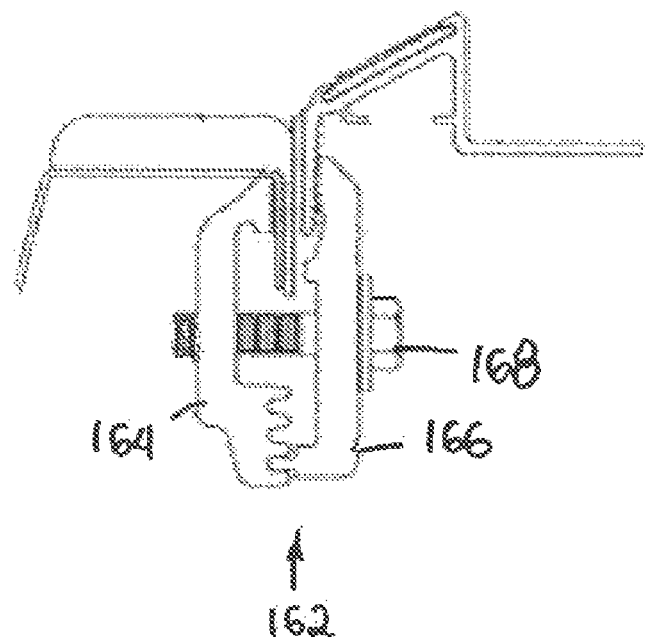
FIG. 18 is a side view showing attachment of the frame portion to the cargo box of the pickup with the clamp.

The back rail sections 114 may be attached to sides of the pickup cargo box 12 with a plurality of clamping mechanisms 162, as illustrated in FIGS. 17-18. Each of the clamping mechanisms 162 may include a first clamp section 164 and a section clamp section 166 that are held together with a screw 168 or other fastening device. Alternatively, the clamps 162 may be manually operated such as by using an over-center configuration.

Proximate a first ends thereof, the first clamp section 164 and the second clamp section 166 may each include a first clamping surface 170. The first clamping surfaces 170 are adapted for gripping the cover attachment region 122 to the pickup cargo box 12. To enhance the gripping ability, the first clamping surfaces 170 may include a texture or an adhesive material.

Proximate a second end thereof, the first clamp section 164 may include a least one recess 172. Proximate a second end thereof, the second clamp section 166 may include an extension 174. Each of the at least one recess is adapted to receive the extension 174. Changing which of the at least one recesses 172 that is used allows the position of the first clamp section 164 to be moved with respect to the second clamp section 166 to adapt the clamping mechanism 162 for different applications.

Figure 19:
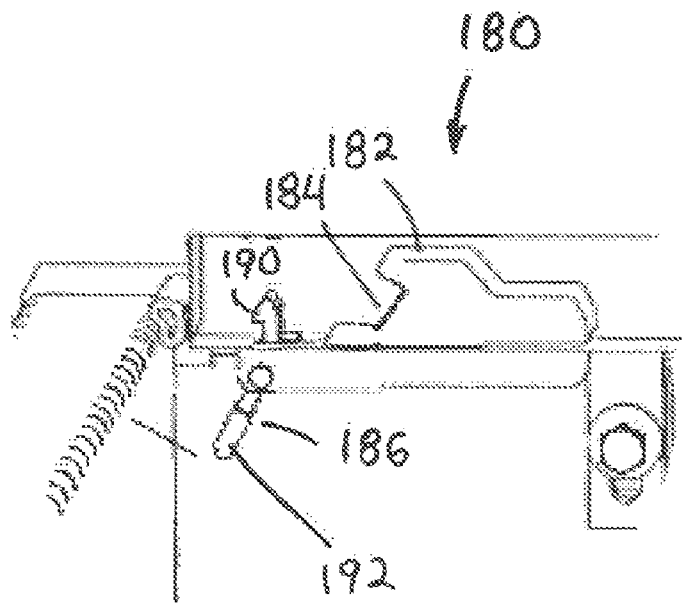
FIG. 19 is a side view of a rear latch mechanism.
Figure 20:
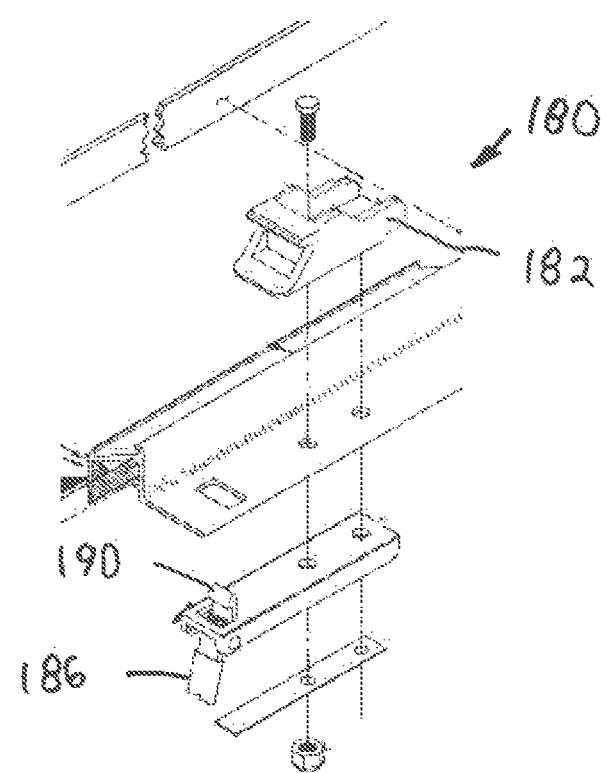
FIG. 20 is an exploded perspective view of the rear latch mechanism.

At least one of the back rail sections 114 may include a back locking mechanism 86, as illustrated in FIGS. 19-20. The back locking mechanism 86 may have a guide portion 182 with a recess 184 that is adapted to receive the extension 90 on the back header 42 to assist in locking the cover portion 20 in a stationary position with respect to the frame portion 22.

The back locking mechanism 86 may also include a latch mechanism 186 that is operably attached to the back rail section 114. The latch mechanism 186 may include a latch portion 190 and a handle portion 192 at opposite ends thereof. The latch portion 190 is adapted to engage the lock channel 82. The handle portion 192 may extend below the back rail section 114 to permit the latch mechanism 186 to be operated when the cover portion 20 is in the closed position by lowering a tail gate on the pickup cargo box.

Figure 21:
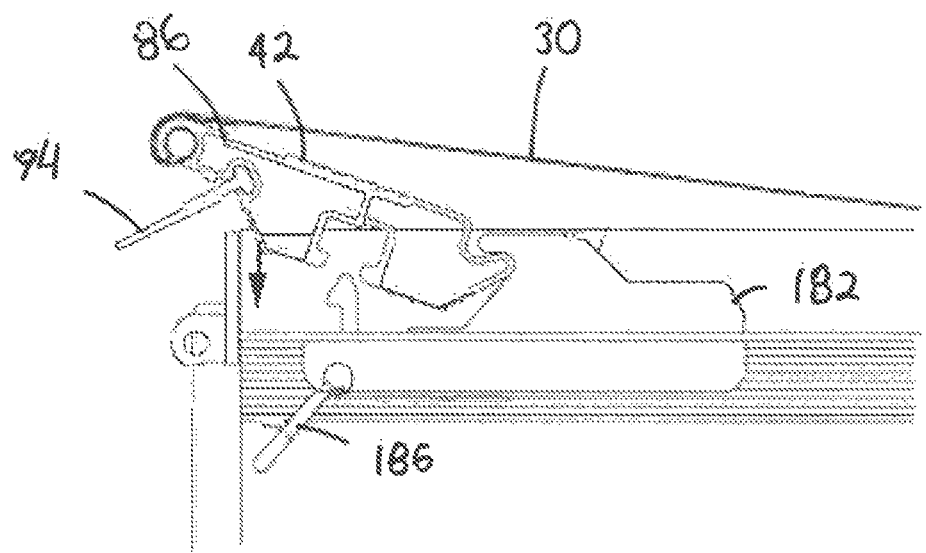
FIG. 21 is a side view of a back latch mechanism in an unlatched configuration.
Figure 22:
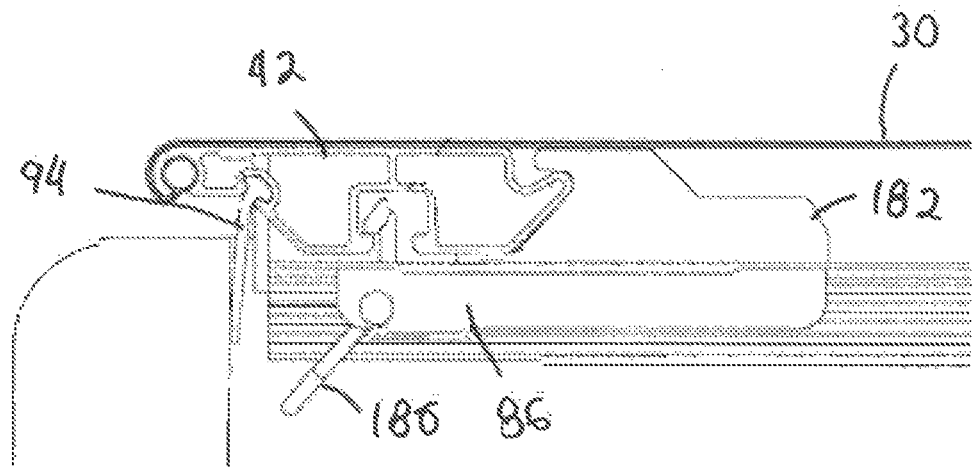
FIG. 22 is a side view of the back latch mechanism in a latched configuration.

When moving the back header 42 into a locking position, the back header 42 is oriented so that the extension 90 is positioned in the recess 184, as illustrated in FIG. 21. The back edge 76 of the back header 42 is pivoted downwardly until the latch portion 190 extends into the lock channel 82, as illustrated in FIG. 22. The back door on the cargo box 12 may be closed. The weather seal 94 rests against the back door to prevent water from entering the cargo box 12.

A front locking mechanism 66 controls pivoting of the cover portion between the closed configuration and the front open configuration. The front locking mechanism 66 may include two front mount bars 202, a crossmember 204 and a front latch mechanism 206, as illustrated in FIGS. 21-22.

Figure 23:
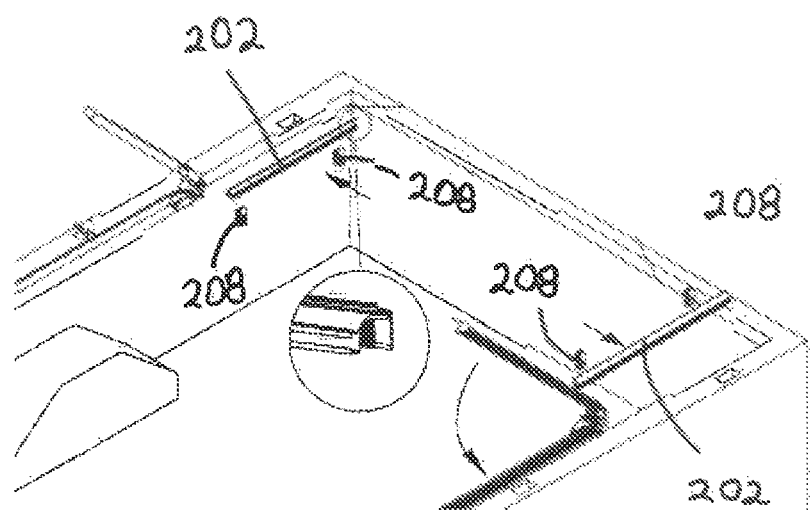
FIG. 23 is an exploded perspective view of a front section of the frame portion.
Figure 24:
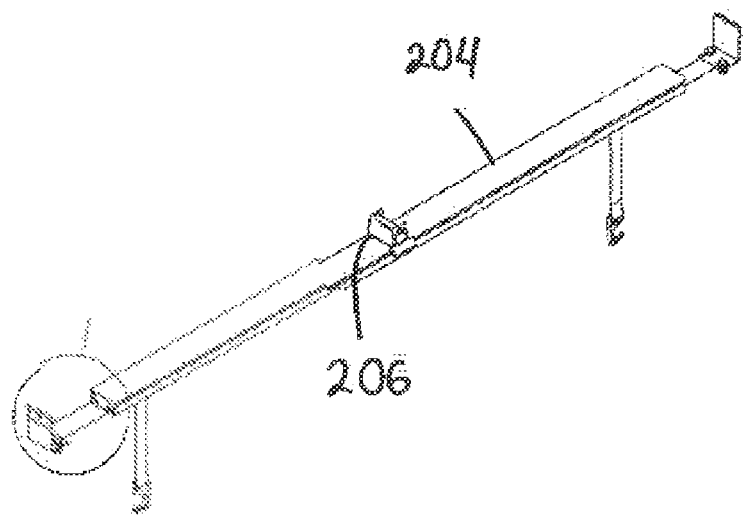
FIG. 24 is a perspective view of a crossmember section of the frame portion.

The front mount bars 202 are attached to the pickup cargo box 12 using a clamping mechanism 208, as illustrated in FIG. 23, that may be similar to the clamping mechanism illustrated in FIGS. 17-18. The crossmember 204, as illustrated in FIG. 24, is attached to the front mount bars 202 proximate a front end of the pickup cargo box 12.

Figure 25:
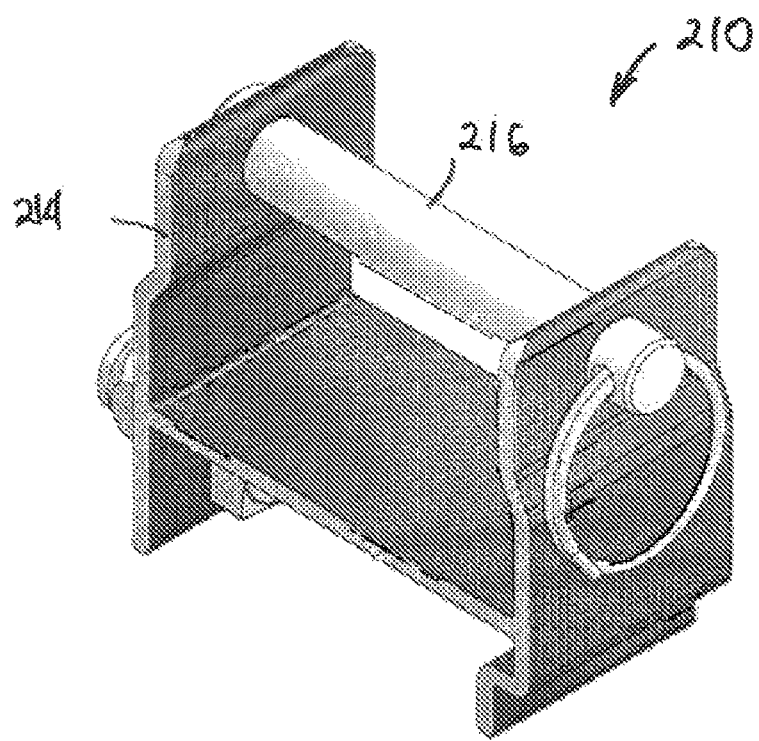
FIG. 25 is a perspective view of a strike pin assembly for use on the crossmember section.

The front latch mechanism 206 includes strike pin assembly 210 and a latch assembly 212. The strike pin assembly 210 is attached to an intermediate location on the crossmember 204. The strike pin assembly 210 generally includes a frame 214 and a strike pin 216, as illustrated in FIG. 25.

Figure 26:
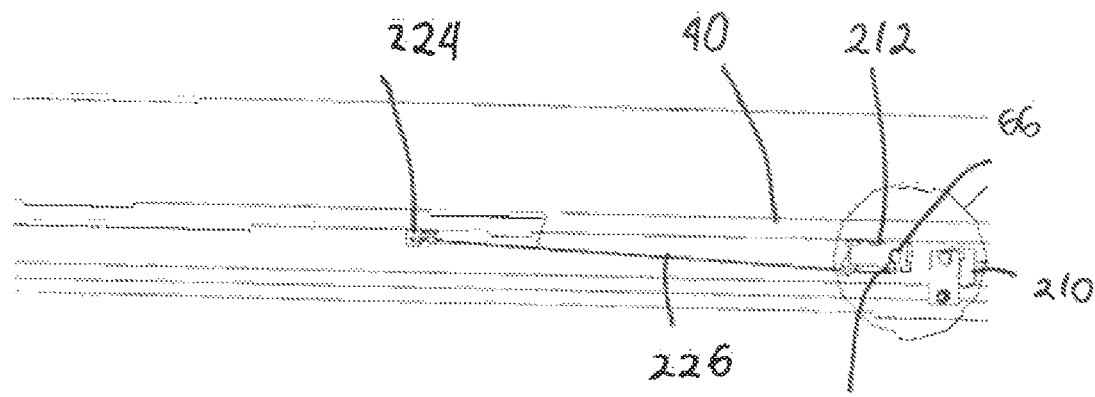
FIG. 26a is side view of a front latch mechanism in an unlatched configuration.
Figure 27:
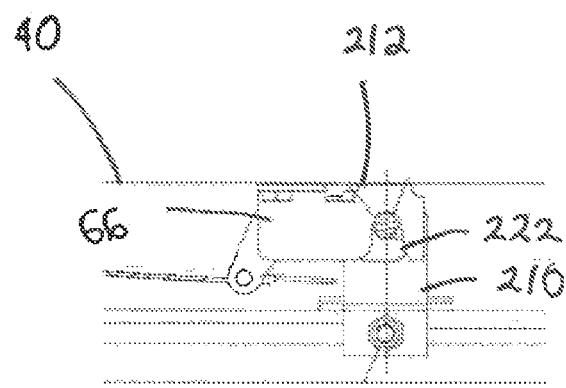
FIG. 27 is a side view of the front latch mechanism in a latched configuration.
Figure 28:
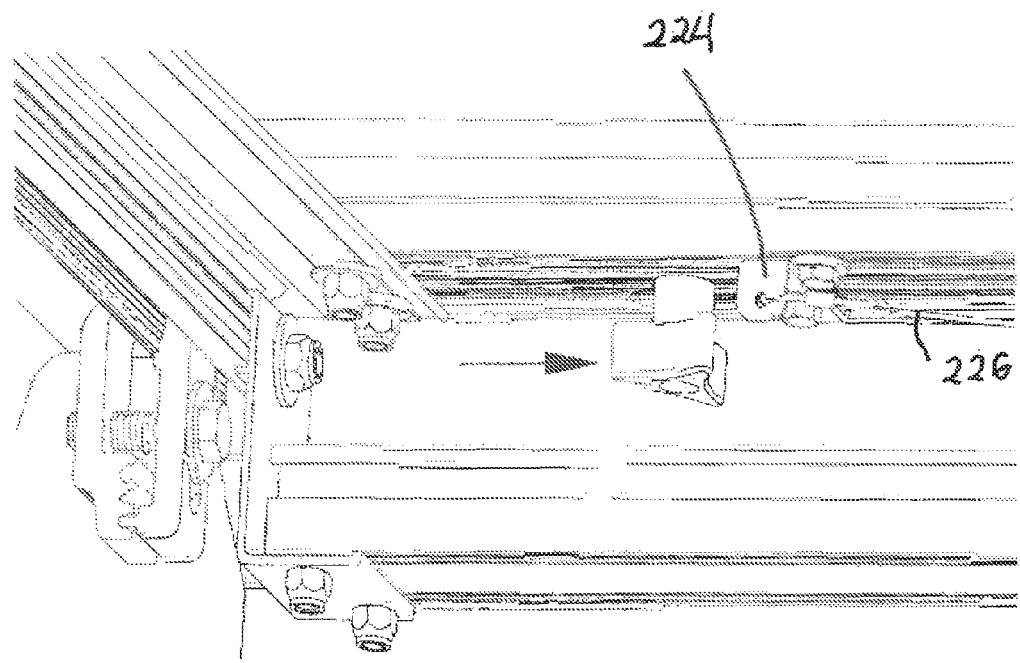
FIG. 28 is a perspective view of a stop mechanism that prevents the handle from being moved from the latched configuration.

The latch assembly 212 may be attached to the front header 40, as illustrated in FIG. 26. The latch assembly 212 includes a recess 220 formed therein that is adapted to receive the strike pin 216. When the strike pin 216 is positioned in the recess 220, a latch 222 retains the latch assembly 212 in a stationary position with respect to the strike pin assembly 210 to retain the cover portion 20 in the closed position, as illustrated in FIG. 27.

The latch assembly 212 may be remotely operated using a handle 224 that is pivotally attached to the front header 40. The handle 224 may be operably attached to the latch assembly 212 using a cable 226. The handle 224 may be accessed while the cover is in the closed position by the user placing his/her hand along the front edge of the cover 10 and moving to one of the sides. As an alternative to manually operating the latch assembly 212, it is possible to operate the latch assembly 212 using a power-assisted mechanism (not shown).

Figure 29:
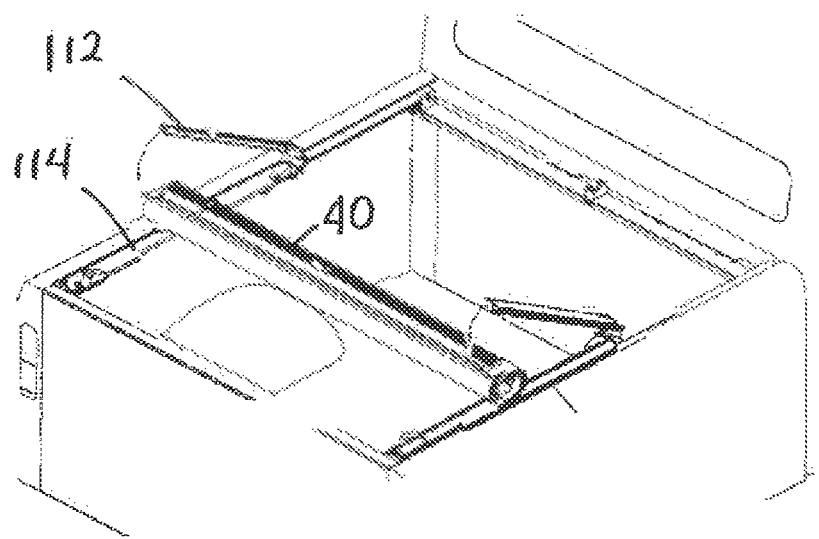
FIG. 29 is a perspective view of the cover portion being attached to the frame portion.

When assembling the tonneau cover 10, the back rail sections 114 are attached to the pickup cargo box 12 using a plurality of clamping mechanisms 162. The cover portion 20 is placed in a rolled-up configuration. The front rail sections 112 are pivoted towards the back rail sections 114 so that free ends of the back rail sections are adjacent ends of the front header 40, as illustrated in FIG. 29. The ends of the front rail sections 112 are then attached to the front header 40 using a fastener such as screws.

Figure 30:
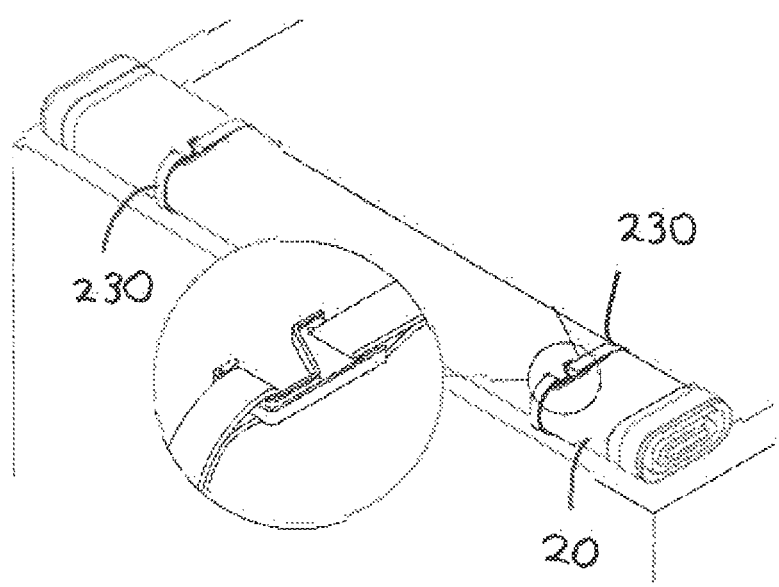
FIG. 30 is a perspective view of the cover portion secured in the rolled-up configuration.

The tonneau cover 10 may include at least one safety strap 230 to retain the cover portion 20 in the rolled up configuration, as illustrated in FIG. 30. The safety straps 230 may have a hook and loop configuration. Alternatively, the safety strap 230 may include a hook and loop fastener such as is available under the designation VELCRO.

Next, the front rail sections 112 are pivoted to the flat configuration so that the latch assembly 212 engages the strike pin assembly 210. The cover portion 20 is then unrolled. The back header 42 is pivoted until the back locking mechanism 180 engages the lock channel 82. The releasable fastener on the cover portion is secured to the releasable fastener on the front rail sections 112 and the back rail sections.

While illustrated as folding in two sections, the concepts of the invention may be adapted for alternative folding configurations such as three sections or four sections. The concepts of the invention may also be adapted for use with hard tonneau covers.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A tonneau cover for a cargo box on a pickup, wherein the tonneau cover comprises:
    a frame portions comprising:
        a first side rail comprising a first rail section, a second rail section and a first hinge mechanism operably attaching the first rail section and the second rail section; and
        a second rail comprising a third rail section, a fourth rail section and a second hinge mechanism operably attaching the third rail section and the fourth rail section, wherein the tonneau cover is configurable in a closed configuration, a rolled-up configuration and a front open configuration proximate a first end of the tonneau cover where the first rail section is oriented at an acute angle with respect to the second rail section and where the third rail section is oriented at an acute angle with respect to the fourth rail section, wherein the first rail section and third rail sections are attachable to the cargo box and wherein the second rail section and the fourth rail section are opposite the first end of the tonneau cover; and
    a cover portion having a relatively flexible configuration, wherein the cover portion is attached to the frame portion.

2. The tonneau cover of claim 1, wherein the tonneau cover is rolled up from a back end to a front end.

3. The tonneau cover of claim 1, wherein pivoting of the portion of the tonneau cover is from a front end to a back end.

4. The tonneau cover of claim 1, and further comprising a clamp mechanism for attaching at least one of the first rail section and the second rail section to the cargo box.

5. The tonneau cover of claim 1, wherein the first hinge mechanism and the second hinge mechanism each comprise a first hinge section, a second hinge section and a central hinge section operably attaching the first hinge section and the second hinge section.

6. The tonneau cover of claim 5, wherein the central hinge section comprises a first hinge part and a second hinge part that are slidable with respect to each other.

7. The tonneau cover of claim 6, wherein the first hinge part is biased apart from the second hinge part.

8. The tonneau cover of claim 1, and further comprising a back locking mechanism attached to at least one of the back rail sections, wherein the back locking mechanism retains a back end of the tonneau cover in the closed configuration.

9. The tonneau cover of claim 8, wherein the back locking mechanism comprises a guide portion and a back latch mechanism.

10. The tonneau cover of claim 1, and further comprising a front locking mechanism operably attached to the cargo box, wherein the front locking mechanism retains a front end of the tonneau cover in the closed configuration.

11. The tonneau cover of claim 10, wherein the front locking mechanism comprises a crossmember, a strike pin assembly and a front latch assembly, wherein the crossmember is attached to the cargo box, wherein the strike pin assembly is attached to the crossmember, and wherein the front latch assembly is attached to the cover portion.

12. The tonneau cover of claim 1, and further comprising at least one bow extending between the first rail section and third rail section or between the second rail section and the fourth rail section.

13. A tonneau cover for a cargo box on a pickup, wherein the tonneau cover comprises:
    a frame portion comprising:
        a first side rail comprising a first rail section, a second rail section and a first hinge mechanism pivotally and slidably attaching the first rail section and the second rail section; and
        a second side rail comprising a third rail section, a fourth rail section and a second hinge mechanism pivotally and slidably attaching the third rail section and the fourth rail section; and
    a cover portion attached to the frame portion wherein a first end of the cover portion is rollable to a rolled-up configuration where substantially all of the cargo box is not covered by the cover portion and wherein the first rail section and third rail sections are attachable to the cargo box and wherein the second rail section and the fourth rail section are opposite the first end of the tonneau cover.

14. The tonneau cover of claim 13, wherein the first hinge mechanism and the second hinge mechanism each comprise a first hinge section a second hinge section and a central hinge section pivotally attaching the first hinge section and the second hinge section.

15. The tonneau cover of claim 14, wherein the central hinge section comprises a first hinge part and a second hinge part that are slidable with respect to each over.

16. The tonneau cover of claim 15, wherein the first hinge part is biased away from the second hinge part.

17. A tonneau cover comprising:
a frame portion comprising:
a first side rail comprising a first rail section, a second rail section and a first hinge mechanism that pivotally connects the first rail section, wherein the first hinge mechanism biases the first rail section away from the second rail section; and
a second side rail comprising a third rail section, a fourth rail section and a second hinge mechanism that pivotally connects the third rail section and the fourth rail section, wherein the second hinge mechanism biases the third rail section away from the fourth rail section, wherein the tonneau cover is configurable in a closed configuration, a rolled-up configuration proximate a first end of the tonneau cover and a front open configuration where the first rail section is oriented at an acute angle with respect to the second rail section and where the third rail section is oriented at an acute angle with respect to the fourth rail section, wherein the first rail section and third rail sections are attachable to the cargo box and wherein the second rail section and the fourth rail section are opposite the first end of the tonneau cover; and
a cover portion attached to the frame portion.

18. The tonneau cover of claim 17, wherein the first hinge mechanism and the second hinge mechanism each comprise a central hinge section, a first hinge section and a second hinge section, wherein the first hinge section and the second hinge section are pivotally attached to the central hinge section.

19. The tonneau cover of claim 17, wherein the central hinge section comprises a first part and a second part that are slidable with respect to each other, and wherein the first part is biased away from the second part.

20. A hinge mechanism comprising:
a central hinge section comprising a first hinge part and a second hinge part that are slidable with respect to each other;
a first hinge section pivotally attached to the first part; and
a second hinge section pivotally attached to the second part.

21. The hinge mechanism of claim 20, wherein the first hinge part is biased away from the second hinge part.

22. A method of operating a tonneau cover with respect to a cargo box on a pickup, wherein the cargo box has a front end and a back end, wherein the method comprises:

positioning the tonneau cover in a closed configuration where the tonneau cover substantially covers the cargo box;
rolling a first end of the tonneau cover to a rolled-up configuration where substantially all of the cargo box is not covered by the tonneau cover;
unrolling the tonneau cover to the closed configuration; and
pivoting a portion of tonneau cover that is opposite the first end to a partial open configuration.

23. The method of claim 22, wherein the tonneau cover comprises a cover portion and a frame portion.

24. The method of claim 22, wherein the tonneau cover is rolled up from the back end to the front end.

25. The method of claim 22, wherein pivoting of the portion of the tonneau cover is from the front end to the back end.

26. The method of claim 25, wherein the frame portion includes a pair of side rails each having a front rail section, a back rail section and a hinge mechanism operably attaching the front rail section and the back rail section.

27. The method of claim 26, wherein the back rail section is attached to the cargo box with at least one clamp mechanism.

28. The method of claim 26, wherein the hinge mechanism comprises a first hinge section, a second hinge section and a central hinge section.

29. The method of claim 28, wherein the central hinge section comprises a first hinge part and a second hinge part that are slidable with respect to each other, wherein the first hinge part is biased apart from the second hinge part.

30. The method of claim 26, and further comprising a back locking mechanism attached to the back rail section, wherein the back locking mechanism retains the back end of the tonneau cover in the closed configuration.

31. The method of claim 30, wherein the back locking mechanism comprises a guide portion and a back latch mechanism.

32. The method of claim 22, and further comprising a front locking mechanism operably attached to the cargo box proximate the front end, wherein the front locking mechanism retains the front end of the tonneau cover in the closed configuration.

33. The method of claim 32, wherein the front locking mechanism comprises a crossmember, a strike pin assembly and a front latch assembly, wherein the crossmember is attached to the cargo box, wherein the strike pin assembly is attached to the crossmember, and wherein the front latch assembly is attached to the cover portion.

* * * * *

UNITED STATES PATENT AND TRADEMARK OFFICE
CERTIFICATE OF CORRECTION

| | | |
|---|---|---|
| PATENT NO. | : 7,828,361 B1 | Page 1 of 1 |
| APPLICATION NO. | : 11/852423 | |
| DATED | : November 9, 2010 | |
| INVENTOR(S) | : Michael Spencer | |

It is certified that error appears in the above-identified patent and that said Letters Patent is hereby corrected as shown below:

Column 2, line 37, "FIG. 26a is" should be --FIG. 26 is a--.

Column 3, line 2, After "and", delete "a".

Column 6, line 7, "ends" should be --end--.

Column 6, line 15, "a least" should be --at least--.

Column 7, line 49, Claim 1, "portions" should be --portion--.

Column 7, line 58-59, Claim 1, After "a rolled-up configuration", delete "and a front open configuration".

Column 7, line 60, Claim 1, After "tonneau cover", insert --and a front open configuration--.

Column 8, line 65, Claim 14, After "first hinge section", insert --,--.

Column 9, line 3, Claim 15, "each over" should be --each other--.

Signed and Sealed this
Eighth Day of March, 2011

David J. Kappos
*Director of the United States Patent and Trademark Office*